United States Patent [19]

Gillner et al.

[11] Patent Number: 4,563,395
[45] Date of Patent: Jan. 7, 1986

[54] PROCESS AND DEVICE FOR PRODUCING TRANSPARENT PLASTIC FILMS, SHEETS OR STRIPS OF AT LEAST TWO LAYERS, BY CASTING

[75] Inventors: Manfred Gillner; Juergen Sieckmann, both of Aachen, Fed. Rep. of Germany

[73] Assignee: Saint-Gobain Vitrage, Courbevoie, France

[21] Appl. No.: 633,460

[22] Filed: Jul. 23, 1984

[30] Foreign Application Priority Data

Jul. 22, 1983 [FR] France ................. 83 12140

[51] Int. Cl.[4] .......................................... B29D 11/00
[52] U.S. Cl. ......................... 428/423.3; 264/1.7; 264/2.3; 264/2.4; 264/39; 264/101; 264/132; 264/331.19; 264/338; 350/321; 425/101; 425/115
[58] Field of Search ............ 264/1.6, 1.1, 1.7, 2.3, 264/2.4, 132, 101, 334, 338, 39, 331.19; 425/115, 101; 428/423.3; 350/321

[56] References Cited

U.S. PATENT DOCUMENTS 2,063,315  12/1936  Kuettel ........................ 264/1.7 X
3,968,309  7/1976   Matsuo et al. ................ 264/1.7 X
4,136,214  1/1979   Bourelier et al. .............. 427/169
4,145,173  3/1979   Pelzer et al. .................. 425/224

FOREIGN PATENT DOCUMENTS 1930291  12/1970  Fed. Rep. of Germany ....... 264/1.7
2422543  12/1974  Fed. Rep. of Germany .
2726159  12/1977  Fed. Rep. of Germany .
2347170  11/1977  France .
1457686  12/1976  United Kingdom .

*Primary Examiner*—Philip Anderson
*Attorney, Agent, or Firm*—Oblon, Fisher, Spivak, McClelland & Maier

[57] ABSTRACT

The invention relates to the production of transparent plastic films, sheets or strips of excellent optical quality. It proposes a process for producing these products by casting of a composition suitable for casting on a horizontal, plane casting support, in continuous movement to obtain at least a layer, which after it has consolidated, is detached from its support, turned over, then by casting a composition on the face of the first layer which, when being formed, initially was in contact with the support, to obtain a second layer, the first layer being placed on a horizontal, plane casting support.

22 Claims, 2 Drawing Figures

PROCESS AND DEVICE FOR PRODUCING TRANSPARENT PLASTIC FILMS, SHEETS OR STRIPS OF AT LEAST TWO LAYERS, BY CASTING

BACKGROUND OF THE INVENTION

1. Field of the Invention

This invention relates to the production of transparent plastic films, sheets or strips, and particularly, to a process in which the plastic is applied, by casting when it is in the form of a solution, a melt or a reaction mixture suitable for casting, on a casting support, in continuous movement in relation to the casting, on which the deposited layer hardens and where after hardening, the resulting film, sheet or strip is detached from the casting support.

2. Description of the Prior Art

During production, by a casting process, of transparent plastic layers having very good optical qualities, the quality of the casting support surface is of decisive importance for the optical quality of layers. So far, to obtain the desired optical properties, it has proven necessary to use, as casting supports, plane glass surfaces having the desired surface quality. A process in which the casting support is a horizontal, continuous strip of juxtaposed glass plates is known, for example, from the publication of German patent DE-OS No. 27 26 159. A process in which the casting support is a continuous, horizontal glass ribbon, which is used directly at the output of its production line, is also known from German patent DE-PS No. 24 22 543.

These known processes obtain satisfactory results as far as the optical qualities of the resulting layers are concerned. However, they also have a certain number of drawbacks. Thus, in case the casting support is a horizontal strip formed by juxtaposed glass plates, the parts of the layers formed above the joints between the plates cannot be used. In the case of using a continuous glass ribbon, given the size of present glassmaking units, sufficient layout possibilities are not always available.

SUMMARY OF THE INVENTION

Accordingly, it is an object of this invention to eliminate these drawbacks. The invention has as one of its objects the production of plastic sheets, films or strips having very good optical properties, by a process of casting on a horizontal, plane support, which does not require the use of a casting support having a surface that is perfectly smooth, i.e., free of any flaws that could impair the optical qualities of the layers.

For this purpose, the invention proposes a process in which a sheet is made with at least two layers, by casting on a horizontal, plane casting support, in relative movement in relation to the casting, of a solution, a melt of reaction mixture to form at least a first layer which, after hardening, for example, by polymerization or solvent evaporation, is detached from the casting support, turned over, again placed on the horizontal casting support or another horizontal, plane casting support on which it is held, and by casting of a solution, a melt or a reaction mixture on the face of this first layer, which was initially in contact with the casting support, to form a second layer exhibiting optical properties equivalent to that of the first layer. The term "turned over" means, according to the invention, that the face of the first layer initially directed downward, therefore on the side opposite the casting, is directly upward to receive the other layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
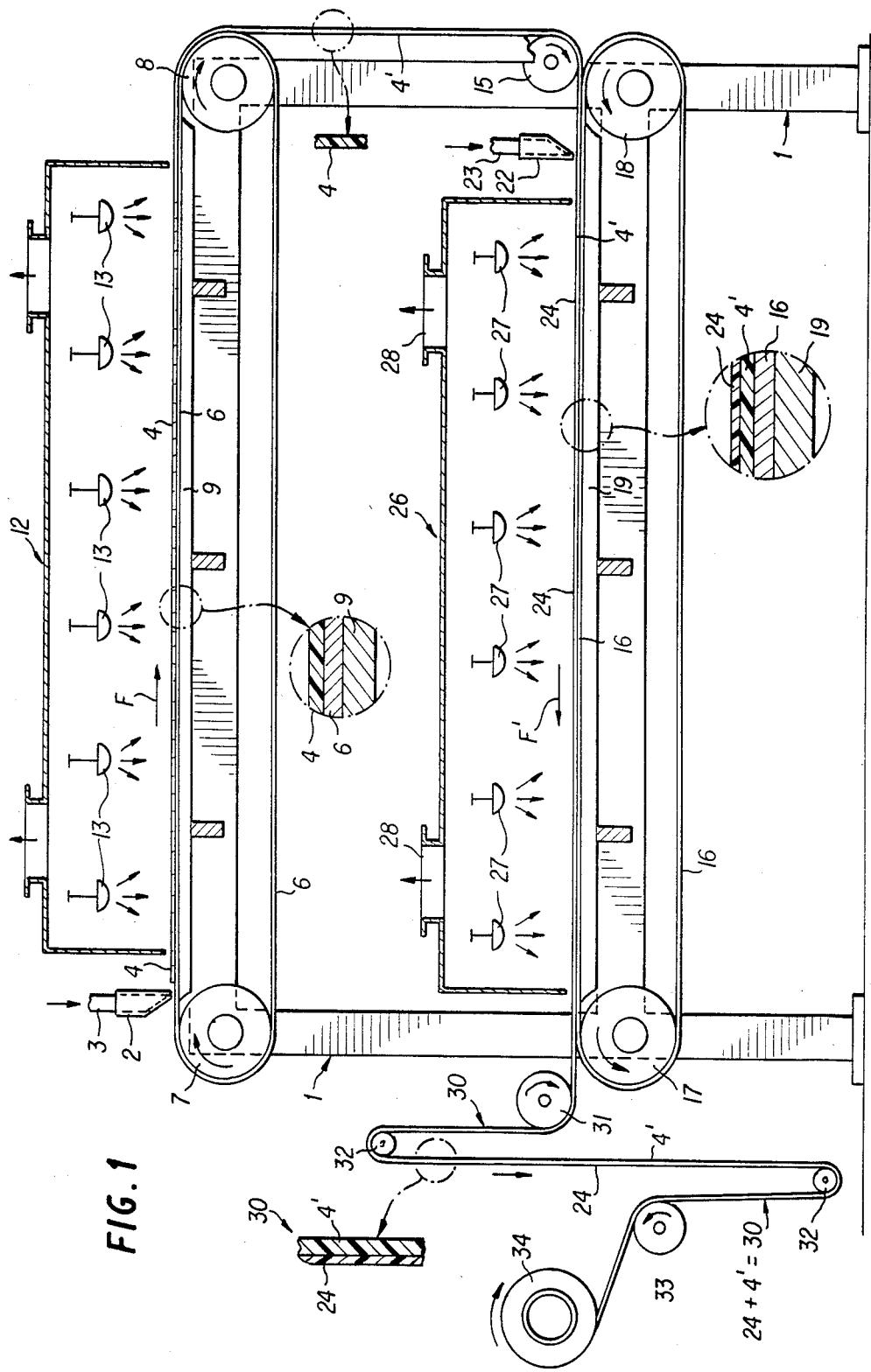
FIG. 1 is a representation of a device, according to the invention, which can be used to produce a continuous plastic sheet with two layers.

It is indeed remarkable and utilized by the invention that the free face of a layer produced by a casting process is in all circumstances in the form of a plane surface with excellent optical properties, even when the casting support does not have said optical properties to such a high degree, provided, however, that, after it has been turned over, the first layer is again placed on a horizontal, plane support and held on it. The invention therefore makes it possible to obtain a sheet having at least two layers, neither of whose outside faces, before consolidation of the layers giving rise to the formation of these faces, is in direct contact with the casting support. Thus, the inevitable impression of the undesirable surface flaws of said casting support on the face of the layer being formed which is in contact with the casting support becomes secondary. Actually, as a result of turning the first layer over, the face in question constitutes an inside face covered by a second layer, also cast, of the layer until finally produced.

Production, by a solution process, of a film having smooth surfaces without the use of a smooth support, is known from the publication of Belgian patent No. 678 248. For this purpose, it was proposed to spread a film-forming solution on the surface of the film which was in contact with the support, by using the film as a second support. But this process is not suited to production of a layer of plastic of optical high quality, i.e., of an optical quality meeting standards for use in laminated glass, because this production requires casting on a perfectly plane, horizontal support.

The horizontal, plane position of the first layer on the second support for producing the second layer is an essential characteristic of the invention. This position can be assured by additional holding, for example, electrostatically or by suction.

The horizontal, plane position of the first layer can be improved by stiffening it, for example, with a reinforcement sheet.

The process which is an object of the invention, can be applied to producing a sheet having two layers of the same nature. In particular, the two layers can be obtained from a reaction mixture suitable for casting and comprising the constituents necessary for obtaining a thermosetting aliphatic polyurethane, i.e., entirely cross-linked. The necessary polyol and isocyanate components are such that at least one of the two types of components has a functionality of 3. There can be used as the isocyanate component: hexamethylene diisocyanate, trimethylhexamethylene diisocyanate, 4,4'- methylenecyclohexyl diisocyanate, isophorone diisocyanate or their biurets, isocyanurates and similar tri- or polyfunctional groups, as also polyfunctional polyols, i.e., branched, for example, polyesters or polyethers as obtained by reaction of polyfunctional alcohols such as glycerol, trimethylolpropane, hexanetriol, pentaerythritol, sorbitol, etc., with aliphatic dicarboxylic acids such as adipic acid, or with cyclic ethers such as ethylene oxide, propylene oxide or tetrahydrofuran. The molecular weights of the branched polyols should be between 250 and 4000 and are preferably from 450 to 2000. Such a sheet can be used particularly as a coating for motor vehicle windshields thanks to its highly elastic properties giving it antilaceration and self-healing properties.

The process can also be applied to production of two layers of a slightly cross-linked polyurethane obtained by reactive casting at high temperature, on the order of 80° to 140° C., from a mixture of polyol and isocyanate components that are essentially difunctional or exhibit a small amount of one or other of these components in trifunctional form. In particular, the reaction mixture comprises an isocyanate component with a viscosity less than 5000 centipoises at 40° C. and a polyol component, the isocyanate component comprising at least an aliphatic or cycloaliphatic diisocyanate or an isocyanate prepolymer, the polyol component comprising at least a difunctional long polyol of a molecular mass between 500 and 4000 and at least a short diol as a chain-lengthening agent.

According to an embodiment of the invention, the process is applied to production of a sheet with two layers of a different nature, but exhibiting equivalent optical properties.

In particular, the first layer, with a thickness, for example, between 0.2 and 0.3 mm and preferably between 0.4 and 0.6 mm, can be obtained from a reaction mixture suitable for casting and intended to obtain a thermosetting aliphatic polyurethane, as defined above, and the second layer, with a thickness, for example, between 0.1 and 0.8 mm from a solution of a molten composition or a reaction mixture to obtain an essentially linear thermoplastic polyurethane having adhesive properties. The initial components for the thermoplastic polyurethane can be: linear polyols such as adipic acid polyesters having a molecular weight of 500 to 4000 and preferably 1000 to 2000, obtained, for example, from 1,2-propanediol, 1,4-butanediol, 1,3-dimethylpropanediol, 1,6-hexanediol, or mixtures of these linear polyesters having a molecular weight also between 500 and 4000 and preferably between 1000 and 2000, obtained from ethylene oxide, propylene oxide or tetrahydrofuran; and isocyanates such as hexamethylene diisocyanate, trimethylhexamethylene diisocyanate, m-xylylene diisocyanate, 4-4'-methylenebis(cyclohexyl isocyanate), isophorone diisocyanate or their linear derivatives.

This sheet is intended particularly to be deposited on a transparent rigid support of silicate glass to constitute a laminated glass, particularly for motor vehicle windshields.

According to another embodiment of the invention, the first layer is still a thermosetting aliphatic polyurethane and the second layer is the slightly cross-linked polurethane cited above.

The process can also be applied to a sheet of more than two layers when it is desired to obtain a multilayer sheet with good optical properties, it being understood that neither of the two faces of the resulting sheet has been placed in contact with the casting support when they were being formed.

According to another embodiment of the invention, it is possible to treat the face of the first layer, initially in contact with the support, before application of the second layer, and then to protect this treatment by application of the second layer. Thus, advantageously, it is possible to print on the face initially in contact with the support and then cover the printing with the second layer that protects this printing. The printing can consist of the formation of filtering strips with a printing ink.

The invention also relates to a device for using the process.

The device according to the invention comprises a horizontal, plane casting support for forming the first layer, means for removing the formed layer and turning it over, a horizontal, plane support for the turned over layer, means for applying the material to be cast placed above the casting support and the support of the turned over layer, at least in their upstream zone, and means for hardening the layers, particularly by polymerization and/or solvent evaporation.

As described above, it is essential, to obtain a good optical quality, that the casting support be horizontal both for applying the first layer and for supporting this layer for application of the second layer.

The casting support for forming the first layer can be a horizontal endless belt. The casting support is a material that allows casting, for example, a metal such as stainless steel. If necessary, it is coated with a separation agent facilitating removal of the formed layer.

The support for the turned over layer is of the same type, namely, a horizontal, endless plane belt.

The supports may be covered by a separation means, e.g., a separation agent, as is well known in the art.

In a preferred embodiment of the device, the casting support and the support for the turned over layer are formed from two horizontal, endless metal belts, advantageously placed below one another, optionally covered with a layer of a separation agent, for example, silicon-treated paper.

When the first layer does not exhibit mechanical characteristics enabling it to rest perfectly plane and horizontal on the second support, the device then comprises means assuring this horizontal, plane holding. These means are, for example, electrostatic means. In a variant, the second support is perforated and is associated with suction means that hold the layer flat against it.

Figure 2:
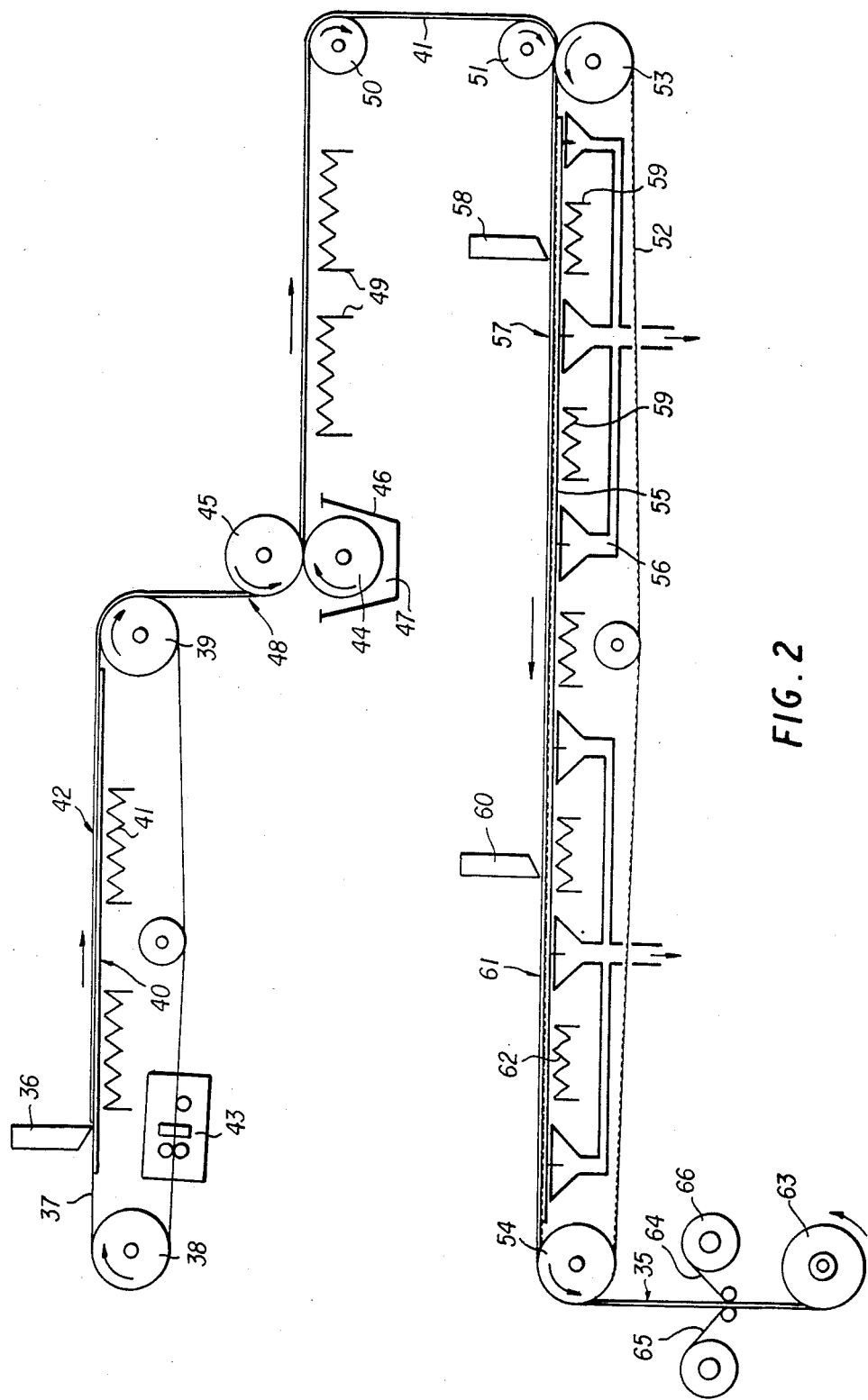
FIG. 2 is a representation of a device, according to the invention, which can be used for producing a three-layer sheet comprising a printing layer.

Referring now to the drawings, wherein like reference numerals designate identical or corresponding parts throughout the several views, and more particularly to FIGS. 1 and 2 thereof, the device of FIG. 1 can be used to produce a continuous plastic sheet with two layers, for example, a thermosetting polyurethane layer exhibiting antilaceration and self-healing properties obtained by reactive casting of a polyol component and an isocyanate component and a polyurethane layer exhibiting adhesive properties, particularly a thermoplastic polyurethane obtained by casting of a solution.

The application that is made of this type of sheet requires it to have excellent optical properties. Also the rigid support for which it is intended should guarantee a flawless transparency and, consequently, should be totally free of streaks or any type of surface irregularities.

This device can also be used to produce a sheet with two layers, one layer a thermosetting polyurethane exhibiting self-healing and antilaceration properties and a polyurethane layer exhibiting energy absorbing properties.

The length of the various parts that constitute it and on which the successive castings are made and the characteristics of the heating elements are suited to the hardening characteristics of the layers to be formed by polymerization or solvent evaporation.

The device comprises two casting zones of approximately identical structure placed over one another perpendicular to a common frame 1.

The first casting zone comprises a casting head 2, for example, a knife casting head as described in the publication of French Pat. No. 2 347 170, with which the material suitable for casting to form the first layer is deposited on a plane casting support. The material is brought to the casting head by conduit 3. A layer 4, of homogeneous thickness, is deposited on the support thanks to the casting head. The casting support consists of an endless, flexible stainless steel belt whose surface is polished. This belt 6 is moved, thanks to two guide rollers 7 and 8 at least one of which is driven so that this steel belt, acting as a casting support, moves at a constant speed in the direction of arrow F. It slides in the casing zone, i.e., the upper part of the belt, on a plane base 9 which acts as a support and makes sure that the steel belt maintains its evenness over the entire casting zone.

Above the steel belt and as a continuation of the casting head in the direction of movement of the belt is a frame 12 in which are placed heating elements 13 making it possible to heat layer 4 to the desired temperature necessary for hardening of said layer, for example, by sufficient polymerization to be able later to detach it from the steel belt.

At the spot where steel belt 6 reaches roller 8 and reverses the direction of its movement, hardened layer 4 (designated 4' in the figure) is detached from the steel belt and is then carried vertically downward. When it reaches guide roller 15, it again changes its direction of movement and is in a direction of horizontal travel in the direction of arrow F'. It advances, in this direction on steel belt 16; the face which, in the first casting zone, was not in contact with the steel belt, is now in direct contact with it. Steel belt 16 is similar to belt 6. Thanks to two guide rollers 17 and 18, at least one of which is driven, it travels at the same speed as belt 6 and, in its upper part, in the direction opposite to that indicated by arrow F'. In the same way as above, the belt slides, in its upper part, on a plane base 19 which acts as a support for layer 4' and thus makes sure that the steel belt maintains its evenness in the entire zone where it acts as a support for the layer or layers.

At the input of this second casting zone, above steel belt 16, is a second casting head 22, of the same type as the first, to which the material suitable for casting is brought by conduit 23. Thanks to this casting head, a second layer 24 of homogeneous thickness is deposited on layer 4'.

Above the steel belt and as a continuation of the casting head in the direction of movement of the belt is a frame 26 comprising heating elements 27. They make it possible to maintain a regulated temperature to accelerate drying of freshly deposited layer 24. Suction pipes 28 enable possible solvent vapors to be evacuated. At the end of the conveying zone of steel belt 16, layer 24 is perfectly dry and solidified, so that sheet 30, made up of two sheets 24 and 4' deposited according to the process indicated, can be detached from the belt at this spot; it can, for example, be carried vertically upward, after having changed directions at the spot where the steel belt reaches guide roller 17, then be wound on roller 34 after having been disengaged from the casting support thanks to rollers 32 and 33.

FIG. 2 shows a device for producing a three-layer sheet 35 comprising an inside printing obtained by depositing ink on the first layer. This device comprises a first casting zone equipped with a casting head 36 placed above the upstream part of a casting support consisting of an endless stainless steel belt 37, driven by two rollers 38, 39. This belt slides over a plane base 40 which acts as a horizontal, plane support. Downstream from the casting head, heating elements 41, placed under the metal belt, assure polymerization of layer 42. Cleaning means 43 are provided on the return of the steel belt. Downstream from the first casting zone, the device comprises a printing system with an inking roller 44, a counterroller 45, and a pan 46 containing printing ink 47. The print is applied by roller 43 onto face 48 which was in contact with the metal belt.

The printing can be of different types; it can, for example, be filtering strips. The printing ink is dried by heating elements 49. After passage around rollers 50, 51, printed layer 41 reaches a second casting zone where it is placed on an endless metal belt 52 driven by two rollers 53, 54. The belt slides over a plane, horizontal table 55. The metal belt and table are perforated so that a suction system 56 makes it possible to apply the layer perfectly to the metal belt. A second layer 57 is deposited on the first layer thanks to a casting head 58. Heating elements 59 assure polymerization of this second layer which covers the printing previously deposited on layer 41.

A third casting zone, placed in the downstream part of the same metal belt 52, makes it possible to apply, by a third casting head 60, an additional layer 61, for example, an adhesive layer which is then hardened by heating elements 62. After detachment of three-layer sheet 35 from the metal belt 52, the sheet is then wound to form a roll 63 after it has been coated on both of its faces with protective films 64 and 65 delivered by rollers 66 and 67.

Other features of the invention will become apparent in the course of the following descriptions of exemplary embodiments which are given for illustration of the invention and are not intended to be limiting thereof.

EXAMPLE 1

A sheet of two layers, namely a thermosetting polyurethane layer and a thermoplastic polyurethane layer having adhesive properties, is produced with the device described with reference to FIG. 1.

A composition suitable for casting to produce the thermosetting polyurethane layer is prepared as follows:

There are homogeneously mixed, while avoiding the formation of air bubbles by degassing under vacuum:
- 1000 g of a polyether prepared by condensation of propylene oxide with a triol, with a molecular weight of about 450 and a 10.5 to 12% free OH radical component,
- 23 g of 2,6-di-t-butyl-p-cresol,
- 0.5 g of dibutyltin dilaurate, and 1000 g of a biuret of 1,6-hexamethylene diisocyanate having a 21 to 25% free NCO radical content.

The composition suitable for casting to form the adhesive layer is prepared as follows:

By heating in a reaction vessel, polyaddition is performed:

of 1000 g of a linear polyester coming from 100 parts of adipic acid and 56 parts of 1,6-hexanediol, 30 parts of 2,2-dimethyl-1,3-propanediol and 7 parts of 1,2-propanediol having a molecular weight of about 1850 and a 1.5 to 1.6% free OH radical content, and 128 g of 4,4'methylenebis(cyclohexyl isocyanate) having a 31.5% free NCO radical content.

The cooled melt is granulated and dissolved in dimethylformamide to obtain a 10% solution.

Starting from these compositions which are suitable for casting, a two-layer sheet is made with the casting device as follows:

The reaction mixture is cast on endless belt 6, which is coated with a separation agent as described in the publication of French Pat. No. 2 383 000, elements 13, hardens by polymerization to give layer 4'. At the end of belt 6, after passage around roller 8, layer 4' is detached from the support and placed on belt 16 after passage around roller 15. The thermoplastic polyurethane solution is cast on layer 4 with casting head 22. Under the action of heating elements 27, the solvent is evaporated, the vapors being evacuated in suction pipes 22, and cast layer 24 hardens. The two-layer sheet is removed from belt 16 and after passage around rollers 31, 32, 33 is wound on roller 34.

EXAMPLE 2

There is produced with the device described in reference to FIG. 1, a plastic transparent sheet with two layers, namely, an adhesive layer having energy absorbing properties and a transparent plastic covering layer that is scratch and abrasion resitant called self-healing or inside protective layer, because it is directed toward the inside of the passenger space in the case of a windshield.

A homogeneous mixture in the following proportions is cast on casting support 6:

1000 g of a polyether with a molecular weight of 450 obtained by condensation of 1,2-propylene oxide with 2,2-bis(hydroxymethyl-1-butanol) and having about 10.5 to 12% free hydroxyl radical component containing 1% by weight of a stabilizing agent, 0.05% by weight of a catalyst, namely, dibutyltin dilaurate, 0.1% by weight of a spreading agent.

1020 g of a biuret of 1,6-hexane diisocyanate having about 23.2% free isocyanate radical content.

A uniform layer is formed which, after polymerization under the effect of heat, for example, for about 15 minutes at about 120° C., exhibits a thickness of about 0.19 mm and self-healing properties. After removal of the layer from belt 6, it is placed on belt 16 for casting of the layer mentioned.

To produce the layer having energy absorbing properties, the polyol component is previously prepared by mixing a polytetramethylene glycol with a molecular mass of 1000 (for example, the product marketed under the name Polymeg 1000 by the Quaker Oats Company), with 1,4-butanediol, the proportions of the two constituents being such that the polytetramethylene glycol contributes 0.37 equivalent in hydroxyl groups while the 1,4-butanediol contributes 0.63 of them.

There are incorporated in the polyol component, a stabilizing agent at a rate of 0.5% by weight of the total mass of the polyol component and isocyante component, a spreading agent at a rate of 0.05% by weight calculated in the same way and a catalyst, namely dibutyltin dilaurate at a rate of 0.02% by weight calculated in the same way as above.

The isocyanate component used is 3-isocyanatomethyl-3,5,5-trimethylcyclohexyl isocyanate (IPDI) exhibiting urea functions obtained by partial hydrolysis of the IPDI and having a content of NCO groups of about 31.5% by weight.

The components are taken in such amounts that the NCO/OH ratio is 1.

After degassing of the components under vacuum, the mixture, brought to about 40° C., is cast on the previously formed self-healing polyurethane layer which has been placed on belt 16. Thus, a layer of about 0.53 mm in thickness is formed which is subjected to a polymerization cycle consisting in heating for 25 minutes at about 120° C.

The two-layer sheet is then removed from support 16 and can be easily handled, stored or used immediately to produce a laminated glass.

EXAMPLE 3

To make the two-layer sheet of Example 2, it is also possible to consider forming the layer having energy absorbing properties first, then after it has been removed from the casting support and turned over, forming the layer having the adhesive properties.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing transparent plastic material having at least two layers, comprising:
    (a) casting at least one plastic layer precursor from a casting means onto an essentially horizontal plane casting support, where said horizontal plane casting support is in movement in relation to said casting means;
    (b) allowing said plastic layer precursor to harden into a first plastic layer through polymerization or solvent evaporation;
    (c) detaching said first plastic layer from said essentially horizontal plane casting support;
    (d) turning over said first plastic layer;
    (e) placing said first plastic layer on an essentially horizontal plane casting support in a fashion such that the face of said first plastic layer in contact with said plane casting support is now exposed;
    (f) casting a plastic layer precursor on a face of the first plastic layer to form a second plastic layer thereto;

wherein said plastic layer precursors comprise a solution melt or a reaction mixture; said transparent plastic material possessing high optical qualities.

2. The process of claim 1, wherein the first and second plastic layers are obtained from plastic layer precursors having the same composition.

3. The process of claim 2, wherein said first and second plastic layers comprise a thermosetting aliphatic polyurethane.

4. The process of claim 1, wherein the first plastic layer and the second plastic layer are obtained from plastic layer precursors having different compositions.

5. The process of claim 4, wherein one of the plastic layers comprises a thermosetting aliphatic polyurethane and the other plastic layer comprises an essentially linear thermoplastic polyurethane.

6. The process of claim 4, wherein one of the plastic layers is a thermosetting aliphatic polyurethane layer the other plastic layer is a slightly cross-linked polyurethane layer obtained by reactive casting of a mixture comprised of a polyol and an isocyanate, where said polyol and said isocyanate are each difunctional, or where either said polyol or said isocyanate is also present in minor amount in trifunctional form.

7. The process of claim 1, wherein a face of the first layer, said face being initially in contact with a horizontal plane support, is treated before application of the second plastic layer thereunto, where second plastic layer covers said treatment.

8. The process of claim 7, wherein said treatment comprises printing.

9. The process of claim 1 wherein said first layer comprises at least two sublayers.

10. The process of claim 1 wherein said second layer comprises at least two sublayers.

11. A plastic sheet of optical high quality obtained by the process of claim 1.

12. A device for use in the process of claim 1, wherein said device comprises a first essentially horizontal plane casting support for forming the first plastic layer, means for removing and turning over the first plastic layer, a second essentially horizontal plane casting support for placement of the turned over first plastic layer, means to apply materials to be cast placed above the first essentially horizontal casting support and the second essentially horizontal plane casting support, where said means to apply said materials to be cast is located at least in the upstream zone of each of said first and second essentially horizontal casting supports, and means for hardening the layers which comprise polymerization or solvent evaporation.

13. The device of claim 12, wherein each essentially horizontal casting support is a horizontal, endless conveyor belt.

14. The device of claim 13, wherein the conveyor belt is a metal belt.

15. The device of claim 14, wherein said metal comprises steel.

16. The device of claim 14, wherein said device comprises a casting support formed by an endless, plane, horizontal steel conveyor belt and a support for the first plastic layer that has been formed and turned over, sais support being also formed by an endless, plain, horizontal steel conveyor belt, the two belts being placed above one another, a drive system making it possibe to remove and turnover the first layer formed, a knife casting head for applying the material to be cast, and heating elements for hardening of the cast layer.

17. The device of claim 12, wherein the casting support is covered by a separation agent.

18. The device of claim 12, wherein the means for applying the meaterial to be cast comprises a knife casting head.

19. The device of claim 12, wherein said device comprises means for treating the first layer, said treating means being downstream of the first essentially horizontal casting support.

20. The device of claim 19, wherein the treating means comprises a printing means.

21. The device of claim 12, wherein said device comprises means for holding the first plastic layer on the second essentially horizontal plane casting support.

22. The device of claim 21, wherein said holding means are suction means associated with a perforated casting support.

* * * * *